United States Patent
Fujihara et al.

(10) Patent No.: US 9,696,909 B2
(45) Date of Patent: *Jul. 4, 2017

(54) CONTACTLESS IC MEMORY ON REMOVEABLE MEDIA

(71) Applicant: INTERNATIONAL BUSINESS MACHINES CORPORATION, Armonk, NY (US)

(72) Inventors: Shinobu Fujihara, Yamato (JP); Diana J. Hellman, Tucson, AZ (US); Glen A. Jaquette, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/997,666

(22) Filed: Jan. 18, 2016

(65) Prior Publication Data

US 2016/0132250 A1  May 12, 2016

Related U.S. Application Data

(63) Continuation of application No. 14/621,856, filed on Feb. 13, 2015, now Pat. No. 9,275,070, which is a continuation of application No. 13/476,129, filed on May 21, 2012, now Pat. No. 9,026,501, which is a continuation of application No. 12/690,170, filed on Jan. 20, 2010, now Pat. No. 8,250,123.

(51) Int. Cl.

| | |
|---|---|
| *G06F 17/30* | (2006.01) |
| *G06F 3/06* | (2006.01) |
| *G11B 27/10* | (2006.01) |
| *G11B 27/11* | (2006.01) |

(52) U.S. Cl.
CPC .......... *G06F 3/0604* (2013.01); *G06F 3/0643* (2013.01); *G06F 3/0688* (2013.01); *G06F 17/30174* (2013.01); *G06F 17/30218* (2013.01); *G11B 27/107* (2013.01); *G11B 27/11* (2013.01); *G11B 2220/655* (2013.01); *G11B 2220/956* (2013.01)

(58) Field of Classification Search
CPC .............. G06F 21/80; G06F 17/30174; G06F 17/30218
USPC .......... 707/690, 812, 823, 824, 830; 711/111
See application file for complete search history.

(56) References Cited

U.S. PATENT DOCUMENTS

| | | |
|---|---|---|
| 6,195,007 B1 | 2/2001 | Takayama et al. |
| 7,486,462 B1 | 2/2009 | Starr et al. |
| 7,539,783 B2 | 5/2009 | Kochunni et al. |
| 7,577,571 B2 | 8/2009 | Yui |

(Continued)

FOREIGN PATENT DOCUMENTS

| | | |
|---|---|---|
| GB | 2406953 A | 4/2005 |
| JP | 2005293626 | 10/2005 |

*Primary Examiner* — Debbie Le
(74) *Attorney, Agent, or Firm* — Griffiths & Seaton PLLC (57) ABSTRACT

Method, system, and computer program product embodiments for recording data on a contactless integrated circuit (IC) memory associated with a data storage cartridge are provided. In one exemplary embodiment, a consistency is verified between a TOC written to a contactless IC memory and an index, wherein if the TOC and the index are inconsistent, a TOC profile file is refreshed with data from the index. The TOC is written to the contactless IC memory.

20 Claims, 6 Drawing Sheets

(56) References Cited

U.S. PATENT DOCUMENTS

| | | |
|---|---|---|
| 7,603,505 B2 | 10/2009 | Stucke et al. |
| 7,681,921 B2 | 3/2010 | Mercer et al. |
| 7,778,925 B2 | 8/2010 | Siegel et al. |
| 8,223,600 B2 * | 7/2012 | Barbian .................... G06F 3/06 369/30.4 |
| 2003/0089809 A1 | 5/2003 | Maekawa et al. |
| 2004/0218214 A1 | 11/2004 | Kihara et al. |
| 2005/0078406 A1 | 4/2005 | Topham |
| 2005/0083796 A1 | 4/2005 | Gold |
| 2006/0101084 A1 | 5/2006 | Kishi et al. |
| 2008/0195784 A1 | 8/2008 | Stucke et al. |
| 2008/0218901 A1 | 9/2008 | Haustein et al. |
| 2009/0109571 A1 | 4/2009 | Hood et al. |
| 2011/0122527 A1 * | 5/2011 | Amir ..................... G11B 15/68 360/92.1 |

* cited by examiner

CONTACTLESS IC MEMORY ON REMOVEABLE MEDIA

CROSS REFERENCE TO RELATED APPLICATIONS

This Application is a Continuation of U.S. patent application Ser. No. 14/621,856, filed on Feb. 13, 2015, which is a Continuation of U.S. Pat. No. 9,026,501, filed on May 21, 2012, which is a Continuation of U.S. Pat. No. 8,250,123, filed on Jan. 20, 2010, the contents of each are hereby incorporated by reference in their entirety.

BACKGROUND OF THE INVENTION

Field of the Invention

The present invention relates in general to computers, and more particularly to a method, system, and computer program product for facilitating data storage using contactless integrated circuit (IC) memory on removable media.

Description of the Related Art

Automated data storage libraries are known for providing cost effective storage and retrieval of large quantities of data. The data is stored on data storage media that is typically contained within a cartridge and referred to as a data storage media cartridge. The media comprises removable magnetic media (such as magnetic tape or disks), optical media (such as optical tape or disks), electronic media (such as PROM, EEPROM, flash PROM, Compactflash™, Smartmedia™, Memory Stick™, etc. or other suitable media. The data storage library contains data storage drives that store data to, and/or retrieve data from the data storage media. The cartridges are stored inside the library in storage shelves when not in use by the data storage drives. One or more robot accessors retrieve selected cartridges from the storage shelves and provide them to data storage drives. Generally, data storage libraries contain a large number of storage shelves to place the cartridges when the cartridges are not in use by a data storage drive. Each storage shelf that may contain a cartridge is referenced or located by the library by a storage shelf address. The data storage library typically includes control electronics that direct the accessors operation, communicate with the data storage drives and interface to one or more host computers to transfer commands and/or data between the host computer and the data storage library. Typically, data stored on data storage media of an automated data storage library, once requested, is needed quickly. Thus, it is desirable that an automated data storage library be maintained in an operational condition as much as possible, such as the well-known "24x7x365" availability.

Various companies manufacture automated data storage libraries, and each company has libraries with different features. Early data storage libraries could only operate with a single host computer. Automated data storage libraries now offer the capability of sharing the entire library with a plurality of host computers. Any host computer that is attached to the library may obtain access to all, or part of the cartridges in the library. The IBM® 3584 UltraScalable Tape Library is an example of a product that has the internal capability to allocate data storage drives and storage shelves to multiple host computers. The data storage library can be divided into one or more logical libraries, where the robotics and electronics are usually shared throughout the library; however, the storage shelves and data storage drives are assigned to one of the logical libraries and are not shared.

SUMMARY OF THE INVENTION

Some removable media used in automated data storage libraries incorporates a contactless integrated circuit (IC) memory referred to as Cartridge Memory (CM). CM is currently used to maintain information relating to the removable media itself, such as cartridge information used in internal operations. The cartridge information may be needed for diagnostic operations, for example. The CM information may be accessed through the drive interface, or the information may be accessed through a CM reader/writer, which accesses the CM through radio frequency (RF) communication.

While diagnostic information relating to the removable media is helpful in many settings, other situations may present where it may be desirable to obtain information about the data stored on the removable media itself. Because such data is generally application specific, however, the maintenance of information relating to or describing this data, such as table of contents information, has required the implementation of unique command sets or modifications to the application to support storage of this information in CM.

In view of the foregoing, a need exists for a mechanism whereby application-specific information describing data stored on removable media may be maintained in CM, so as to allow retrieval without the need for mounting the media in the drive, for example, without necessitating additional resources as previously indicated.

Accordingly, various exemplary method, system, and computer program product embodiments for recording data on a contactless integrated circuit (IC) memory associated with a data storage cartridge are provided. In one exemplary embodiment, by way of example only, a consistency is verified between a TOC (table of contents) written to a contactless IC memory and an index, wherein if the TOC and the index are inconsistent, a TOC profile file is refreshed with data from the index. The TOC is written to the contactless IC memory.

Related system and computer program product embodiments are also disclosed and provide additional advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only embodiments of the invention and are not therefore to be considered to be limiting of its scope, the invention will be described and explained with additional specificity and detail through the use of the accompanying drawings, in which.

DETAILED DESCRIPTION OF THE DRAWINGS

Information technology (IT) is changing many business workflows. Broadcasting or movie production in the media and entertainment industry is a typical example. Conventional storage media such as videotape or chemical film are being replaced with digital files stored in data storage systems. Because tape media offers the lowest cost-per-gigabyte of storage, media such as Linear Tape Open (LTO)-formatted tape can be economically used in such scenarios. In the conventional movie or broadcasting workflow, for example, a single videotape generally corresponds to one video stream. As a result, when a video stream is recorded, its content title is handwritten on a single paper label, and then affixed to the videotape cartridge. If a video stream is recorded as a digital MPEG-compatible file, the file size will be given by the video stream's length. In case of MPEG2 video having a 100 Mbps data rate, 45 minutes of content equates to roughly 33 GB of data. LTO-4 tape media generally has an 800 GB capacity without compression, so that single LTO-4 tapes may store 24 video streams. If a user has multiple LTO-4 tapes with multiple video streams recorded on each, it is difficult to know which video is stored in which LTO tape without mounting the tape on a tape drive, and browsing the contents.

The illustrated embodiments below provide mechanisms for addressing the exemplary issue described above, where a user may be able to determine file information, such as table of contents (TOC) information for an application-specific file system of data, without the need for mounting the removable storage media on a drive and browsing file content. The illustrated embodiments use cartridge memory (CM) to store and retrieve such information in a rapid and non-resource intensive manner as will be further described.

In one embodiment, these mechanisms are operational on newer generation LTO-5 formatted tape, which will feature so-called multiple partition capability, enabling a file system to be stored on the LTO tape. When the file system is implemented for LTO-5-formatted tape, the LTO-5 tape maintains an index partition storing a file index (e.g., file names, directory, location, etc.), and a data partition, where the file data is written. The mechanisms of the illustrated embodiments may use an LTO tape drive to write application file-based TOC information by first parsing the aforementioned index partition. In other words, the LTO drive (such as the LTO-5 drive) may be adapted to parse the contents in the index partition with table of contents (TOC) profile information pre-written on the index partition. The LTO drive then builds the TOC, and writes the TOC to the CM (via RF communication, for example). As long as the file system is operational, the file system or an application does not need to write the TOC information on the storage media itself, and a user may access this information quickly and simply by using wireless communications functionality between a reader/drive and the cartridge.

Various aspects of the following description and claimed subject matter may be implemented in automated data storage library hardware. An exemplary embodiment of such automated data storage library hardware that may be utilized and/or adapted for the purposes of implementing the following includes the automated tape library system disclosed in U.S. Pat. No. 6,895,300, entitled "Use of Cartridge Memory for Storing Logical Library Association Information" dated May 17, 2005 and commonly assigned. The relevant portions of the above patent, such as the description of an exemplary automated data storage library (including robotic accessor(s), etc.), processor nodes, etc., are incorporated herein by reference.

Figure 1:
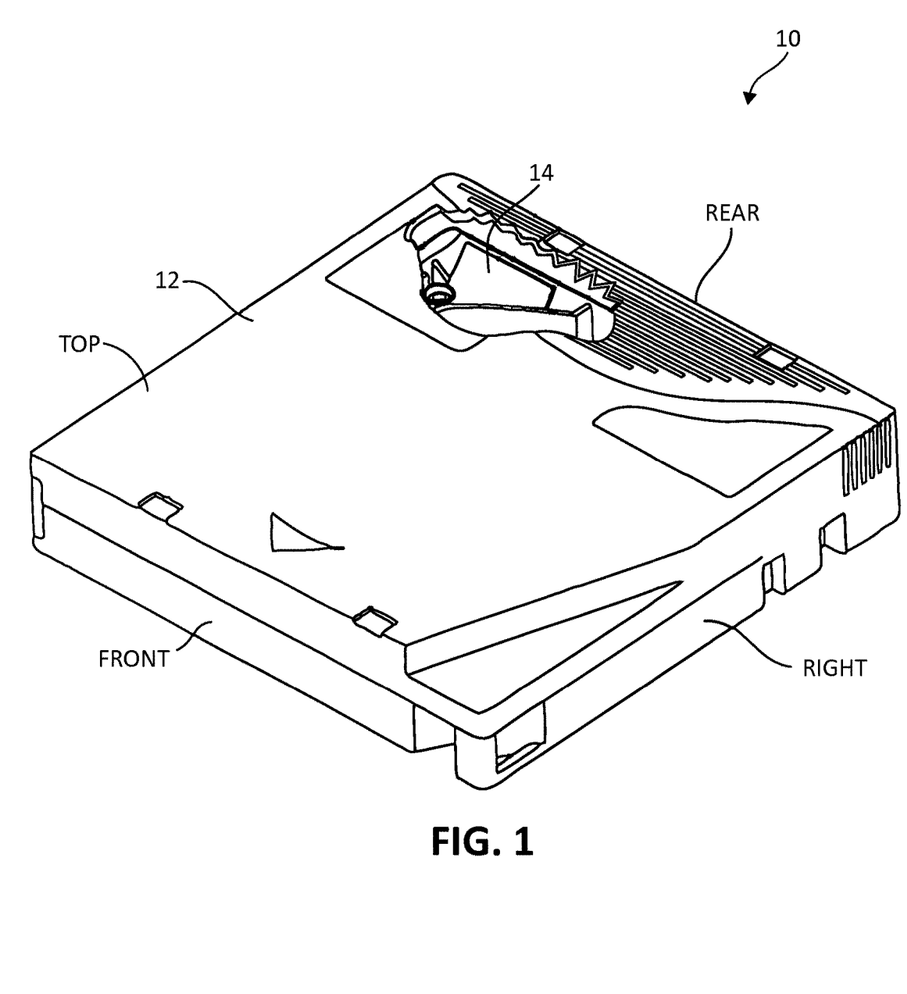
FIG. 1 is an isometric view of an exemplary data storage media cartridge containing a cartridge memory in accordance with one embodiment.

Turning now to FIG. 1, an exemplary removable storage device 10 is depicted capable of implementing various aspects of the following description and claimed subject matter. Removable storage device 10 is designated with front, right, top, and rear portions as shown. Removable storage device 10 includes a data cartridge 12. Each data cartridge 12 may be located in the storage shelves of any of the frames of an automated storage library as one of ordinary skill in the art will appreciate. The data cartridge 12 may comprise a cartridge memory 14. The cartridge 12 contains a storage medium, such as magnetic tape, and a cartridge shell that protects and facilitates handling of the storage medium. Some storage mediums are designed with an integrated cartridge shell, such as a Compact Disc (CD) or Digital Versatile Disc (DVD). For example, the storage medium of a Compact Disc is encased in a transparent material, such as plastic or acrylic. Storage mediums that contain an integrated cartridge shell may additionally contain another cartridge shell to protect the first cartridge shell or to simplify manual or automated handling of the data cartridge. Herein, cartridge shell and shell shall refer to any shell that holds, surrounds, encases, protects or facilitates handling of the storage medium.

The cartridge memory 14 may be associated with any of the aforementioned shells. For example, the cartridge memory 14 may be mounted inside or outside the cartridge shell of a data storage tape cartridge. As another example, the cartridge memory may be mounted inside or outside the innermost shell of a Compact Disc (CD). Alternatively, a portion of the storage medium may be used in place of the cartridge memory. In this case, a cartridge memory reader or cartridge memory writer ay actually read and/or write association information to a portion of the storage medium. Herein, cartridge memory may refer to the storage medium of the data cartridge or it may refer to a memory separate from the storage medium. The cartridge memory 14 may contain information pertaining to the data stored on the media of the data cartridge, and/or it may contain other information related to the use of the cartridge. Cartridge memory 14 is typically available in different capacities depending upon the use requirements.

The contents of cartridge memory 14 can he read or written by physically contacting the cartridge memory with electrical connections from a reader or writer device. The reading or writing device could be part of any gripper assembly of any library frame, as one of ordinary skill in the art will appreciate. The cartridge memory 14 could be read or written whenever the gripper contacts the cartridge, for example before, during or after transportation of the cartridge between the storage shelves, drives, or input/output station. The contents of cartridge memory 14 may also be read or written by wireless communication technology such as with an optical or electromagnetic signal. An example of a wireless optical signal may comprise visible light, infrared light, LASER or other optical technologies as are known to those of ordinary skill in the art. Examples of other wireless electromagnetic signals may comprise Radio Frequency (RF) signals, magnetic induction or other wireless techniques as are known to those of ordinary skill in the art.

For example, the cartridge memory device may use the modulation of electromagnetic radiation to carry information between the cartridge memory and the reading and writing device(s). The electromagnetic carrier radiation may span a range from radio frequencies to visible light. This contactless communication presents numerous advantages because the reader/writer in the gripper assembly only has to come in proximity of the cartridge memory to transfer information. Herein, proximity refers to a minimum distance required to read and/or write the cartridge memory. For example, a cartridge memory that relies on direct electrical connection would require direct contact with electrical contacts or wires. A wireless cartridge memory system would require some minimum distance between the cartridge memory and the cartridge memory reader or cartridge memory writer. In addition to, or instead of being coupled to the library, the cartridge memory reader and/or writer may be coupled to the read/write drive, enabling the reading and writing of the cartridge memory while the cartridge is in the drive.

Herein, the terms cartridge memory reader, memory reader, reader, cartridge memory writer, memory writer, and writer may refer to an interface between the cartridge memory and some other device attempting to read or write the contents of the cartridge memory. For example, the cartridge memory reader and cartridge memory writer may comprise electrical connections, wires, contacts, an antenna, a light detector or emitter, magnetic or optical read head, magnetic or optical write head, etc. In addition, the cartridge memory reader and cartridge memory writer may actually be the same hardware. In the case where the cartridge memory comprises the storage medium of the data cartridge, the reader and/or writer may comprise a device that is capable of reading and/or writing the storage medium. For example, the reader and/or writer may comprise a magnetic tape or disk head, optical tape or disk head, etc. The device capable of reading or writing the contents the cartridge memory may comprise a library controller, a processor or component of the library, a drive, a processor or component of the drive, etc.

Figure 2:
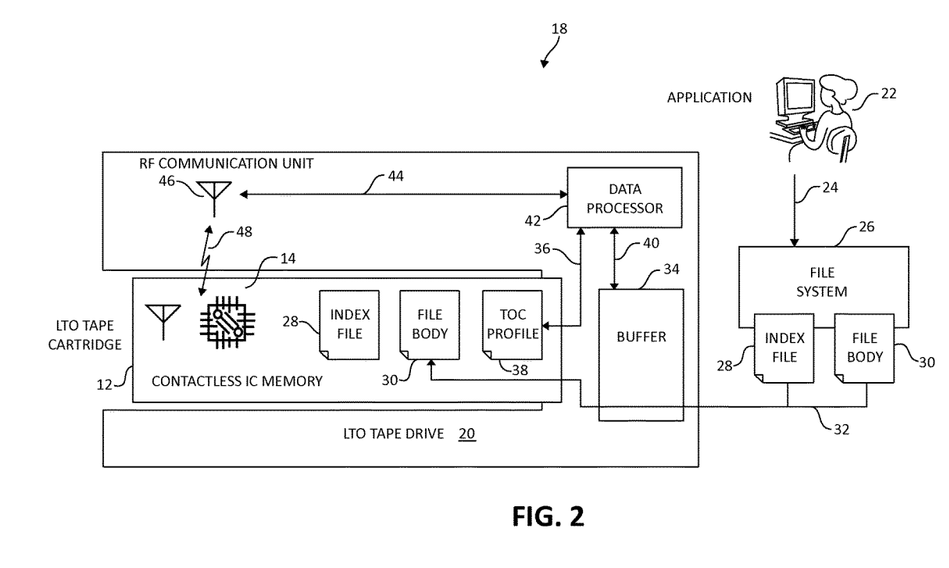
FIG. 2 is a block diagram of exemplary components of a removable data storage media cartridge inserted in a data storage drive, in which various aspects of the following description and claimed subject matter may be implemented.

Turning now to FIG. 2, a block diagram of an exemplary portion 18 of an automated storage library is shown. Portion 18 includes various components of an automated storage library and removable storage media capable of implementing aspects of the present invention. An owning application 22 of a file system 26 is used in conjunction with aspects of the present invention as will be described following. The file system 26 includes an index file 28, and a file body 30 (file data).

A storage drive, such as the depicted LTO tape drive 20 is adapted to receive a removable storage media, in this case, an LTO tape cartridge 12. The LTO tape drive 20 includes, or is in communication with, data processor 42, data buffer 34, and RF communication unit 46 as shown. The LTO tape cartridge 12 includes contactless IC memory 14 (CM) as shown.

In one exemplary embodiment, the mechanisms of the present invention operate to write application file-specific table of contents (TOC) information to the contactless IC memory 14 on the LTO tape cartridge 12 as follows. In a first step, the owning application 22 closes a file in the file system 26 (represented by arrow 24) on the LTO tape media. The file system 26 then writes the index file 28 on the index partition of the storage media mounted on the target LTO tape drive 20, and the file body on the data partition of the same storage media. The target LTO drive 20 receives the index file and the file body in the data buffer 34, and then writes the index file and file body on the storage media (collectively represented by arrow 32).

As a next step, the data processor 42 accesses the index file data on the buffer 34 (represented by arrow 40). The data processor 42 then reads the table of contents (TOC) profile 38, which has been pre-recorded on the same LTO tape storage media (represented by arrow 38). The TOC profile 38 creation process will be further described, following. The data processor 42 then uses the TOC profile 38 as a filter for the index file information stored on the buffer 34 to create a table of contents for the file system 26. After the data processor 42 creates the table of contents, the data processor 42 sends the table of contents to the RF communication unit 46 (represented by arrow 44). The RF communication unit then writes the table of contents to the contactless IC memory 14 (represented by wireless signal arrow 48).

In an additional exemplary embodiment, the mechanisms of the present invention operate to verify consistency between file information as will be presently described. These verification mechanisms may occur pursuant to a triggering event, such as the insertion of an LTO tape cartridge 12 in the LTO tape drive 20 as one of ordinary skill in the art will appreciate. Accordingly, subsequent to such an event, the data processor 42 reads the index file 28 from the index partition in the storage media on the LTO tape cartridge 12. The data processor 42 reads the TOC profile 38 from the same storage media (again, collectively represented by arrow 36), and creates the table of contents by parsing the index file with the TOC profile data as will be further explained. Once the table of contents obtained from the storage media is obtained/created, the version of the table of contents stored on the contactless IC memory 14 is obtained by the RF communication unit 46 (again, represented by arrows 48, 44). The table of contents from either and/or both the storage media, the contactless IC memory 14, and the index file information is cross-referenced for consistency. If an inconsistency is found, the table of contents read from the contactless IC memory 14 is refreshed with data from the index file 28 obtained from the storage media.

Figure 3:
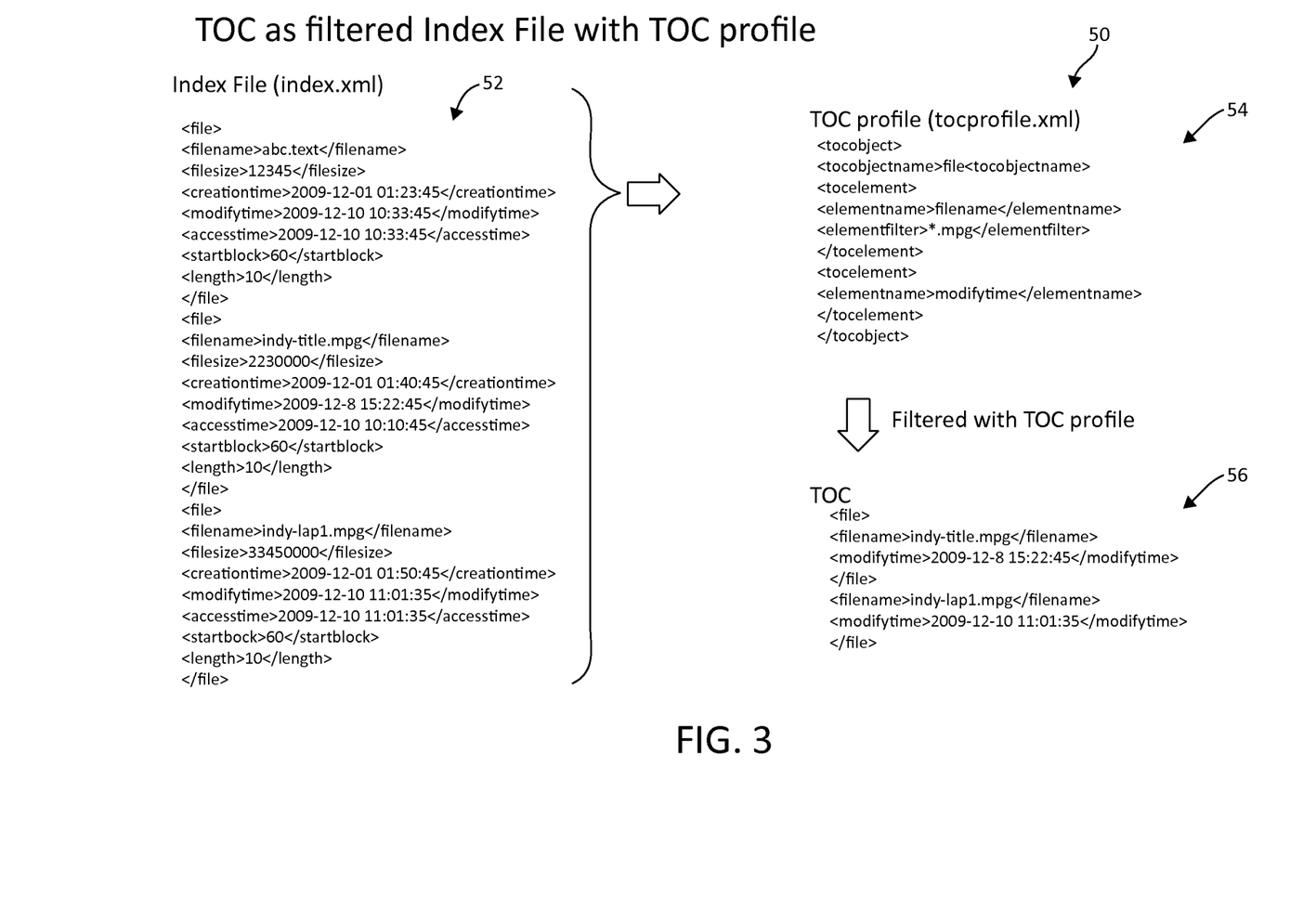
FIG. 3 illustrates an exemplary index file, table of contents (TOC) profile file, and table of contents (TOC) information.

Turning now to FIG. 3, exemplary data 50 used to create a table of contents for storage on the contactless IC memory is depicted index file data. Exemplary index file data 52 is shown as an extended markup language (XML) delineated file, as those of ordinary skill in the art will appreciate. The index.xml file contains a listing of such fields as files, filenames, file sizes, creation times, modifying times, access times, a starting block of memory, and a file length as shown.

An exemplary table of contents (TOC) profile file 54 is additionally shown. TOC profile file 54 is provided as an XML schema, again as one of ordinary skill in the art will appreciate. TOC profile file 54 contains one or more TOC objects, as well as a number of TOC elements associated the TOC object(s). In one embodiment, the index file information 52 may be parsed using the TOC profile 54 to obtain/generate table of contents information (TOC) 56 as shown. The TOC information 56 includes such fields as file, filename, and modify time for each of the number of files in the index file data 52. The TOC information 56 is obtained from the index file data 52 and saved to the contactless IC memory as previously described.

Figure 4:
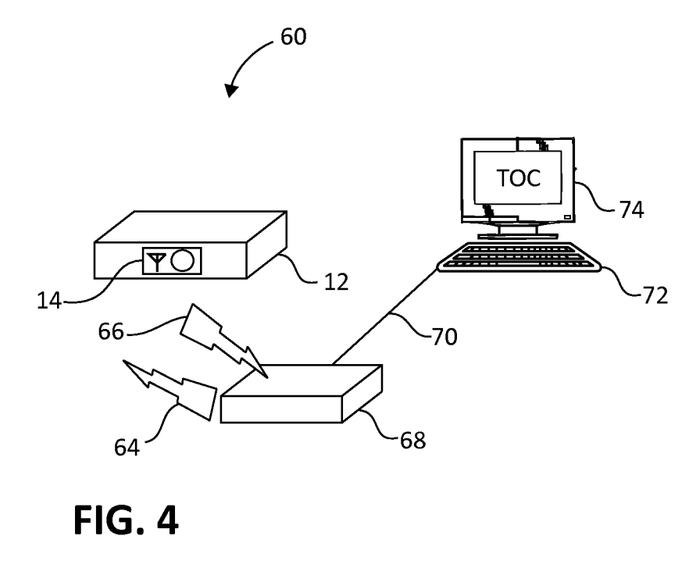
FIG. 4 illustrates retrieval of TOC information from contactless IC memory using a CM reader/writer.

FIG. 4 is a block diagram of exemplary processes of storing and retrieving TOC information to/from contactless IC memory as previously described. In representation 62, the contactless IC memory 14 is embedded or otherwise associated with the removable storage media cartridge 12 as previously described (represented by arrow 64). In representation 60, a removable storage media cartridge 12 having the contactless IC memory 14 is in wireless communication (represented by arrows 64 and 66) with a CM reader/writer 68. The CM reader/writer 68 is in communication with an editing computer 72 via communication link 70 (such as a universal serial bus connection). An editing computer 72 may then display and/or edit the TOC information on display 74 without having to physically insert the cartridge 12 in a storage drive, mount the storage media, and browse the contents as previously indicated.

Figure 5:
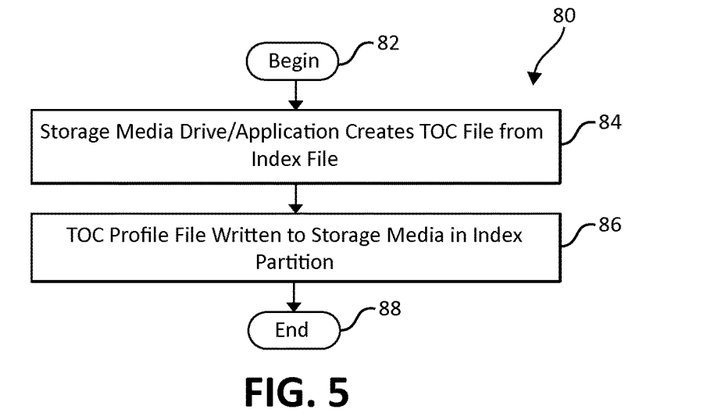
FIG. 5 is a flow chart diagram of an exemplary method for creating a TOC profile file from an index file.
Figure 6:
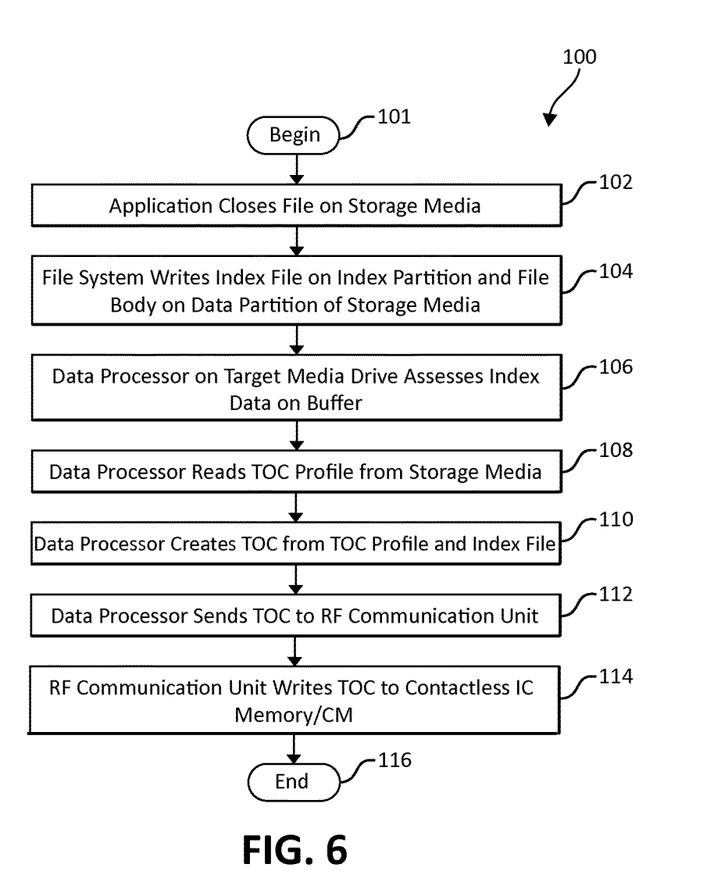
FIG. 6 is a flow chart diagram of an exemplary method for writing TOC information following closure of a file by an owning application.
Figure 7:
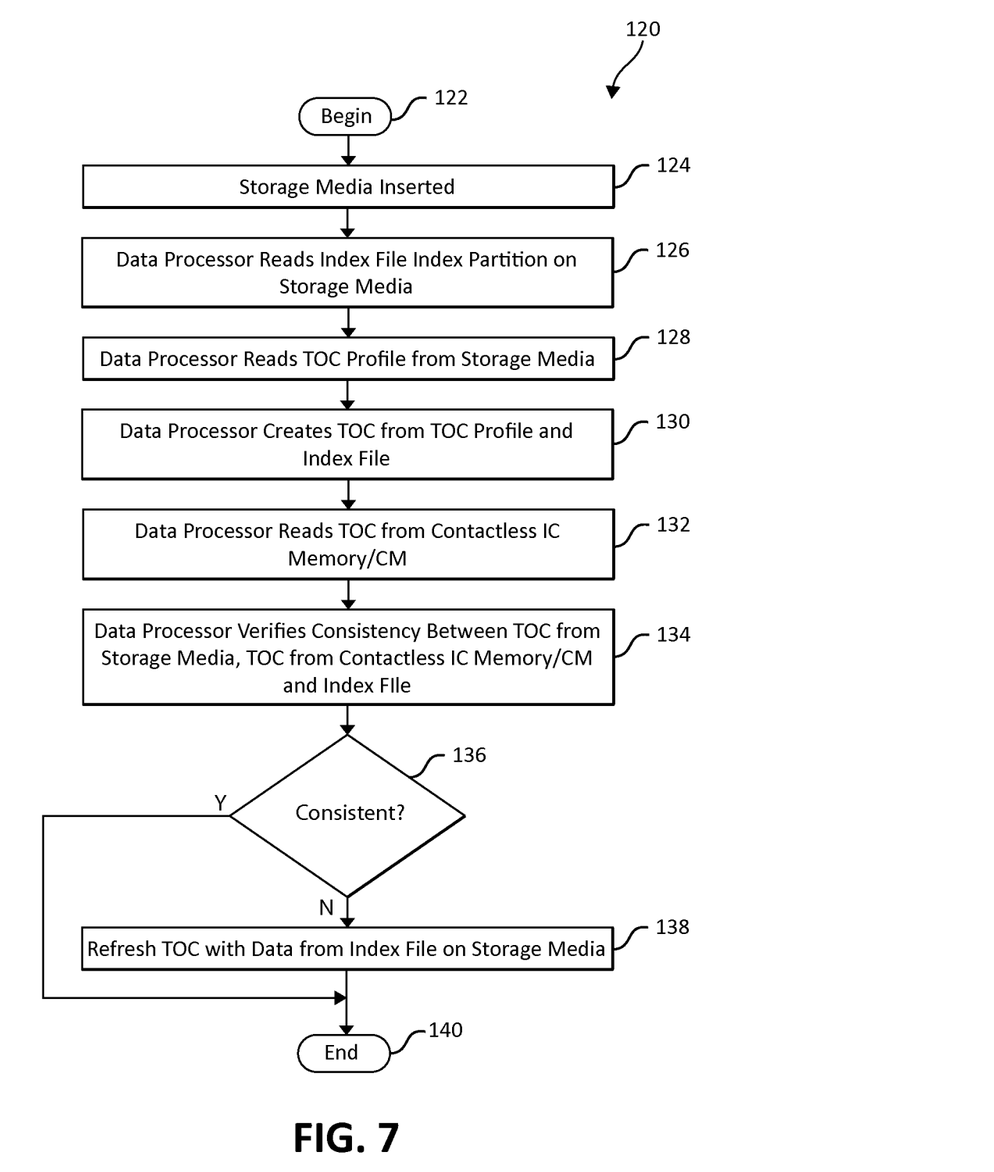
FIG. 7 is a flow chart diagram of an exemplary method for reading and verifying TOC information from CM following insertion of the removable storage media in a storage drive.

Turning now to FIGS. 5-7, exemplary methods 80, 100, and 120 for facilitating storage and retrieval of file information (such as TOC information) to/from contactless IC memory are depicted as various flow chart diagrams. As one of ordinary skill in the art will appreciate, various steps in the methods 80, 100, and 120 may be implemented in differing ways to suit a particular application. In addition, the described methods may be implemented by various means, such as hardware, software, firmware, or a combination thereof operational on or otherwise associated with the storage environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Turning first to FIG. 5, a method for creating TOC profile file information is first depicted in an exemplary embodiment. Method 80 begins (step 82) with the creation of a TOC profile file from the index file of the file system (step 84). The TOC profile file is then written to the storage media in the index partition (step 86). The method 80 then ends (step 88).

Turning next to FIG. 6, a method for writing TOC information to the contactless IC memory is depicted in an additional exemplary embodiment. Method 100 begins (step 101) by an application closing a file on the storage media as previously described (step 102). The file system then writes the index file on the index partition, and the file body on the data partition of the storage media (step 104). The data processor on, or associated with, the target media drive accesses the index file data on the data buffer (step 106). The data processor then reads the TOC profile file from the storage media that was previously saved pursuant to method 80 (FIG. 5) (step 108). The data processor then creates the TOC from the TOC profile file and the index file by parsing the index file, using the TOC profile file as a filter (step 110). The TOC information is then sent by the data processor to the RF communication unit to be written to the contactless IC memory (step 112). The TOC information is then written to the CM (step 114), and the method 100 ends (step 116).

Turning finally, to FIG. 7, a method for verification of TOC information is depicted in an additional exemplary embodiment. Method 120 begins (step 122) with a triggering event, such as the insertion of storage media as previously described (step 124). The data processor then reads the index file (step 126), and the TOC profile file, both from the index partition (step 128). Based on the index file data and the TOC profile file read from the storage media, the data processor creates a TOC (step 130). Additionally, the data processor reads the TOC information presently stored on the contactless IC memory (step 132) and verifies consistency between either the TOC retrieved from the storage media, the TOC from the contactless IC memory, and the index file information retrieved from the storage media (step 134). If the data is consistent (step 136), the method 120 ends (step 140). If not, the TOC on the contactless IC memory is refreshed from data using the index file from the storage media (step 138). The method 120 then ends (again, step 140).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for recording data on a contactless integrated circuit (IC) memory associated with a data storage cartridge, comprising:
   verifying consistency between a TOC (table of contents) written to a contactless IC memory and an index, wherein if the TOC and the index are inconsistent, a TOC profile file is refreshed with data from the index, and
   writing the TOC to the contactless IC memory.

2. The method of claim 1, further including parsing the index of a plurality of files to be recorded on the storage media of the data storage cartridge with the table of contents (TOC) profile file to build the table of contents (TOC) specific to an owning application of the plurality of files.

3. The method of claim 1, further including storing the index on the storage media of the data storage cartridge.

4. The method of claim 1, further including storing the TOC profile file on the storage media of the data storage cartridge.

5. The method of claim 1, further including, previous to verifying consistency between the TOC written to the contactless IC memory and the index:
   building an additional TOC by reading the index and the TOC profile file from the storage media, and
   comparing the additional TOC with at least one of the TOC written to the contactless IC memory and the index to verify additional consistency.

6. The method of claim 1, wherein writing the TOC to the contactless IC memory includes sending the TOC to a radio frequency (RF) communication unit for transmission to the contactless IC memory.

7. A system for recording data file information describing contents of storage media of a data storage cartridge in an automated storage and retrieval library, comprising:
   a processor device operational in the automated storage and retrieval library, the processing device adapted for verifying consistency between a table of contents (TOC) written to a contactless IC memory and an index, wherein if the TOC and the index are inconsistent, a TOC profile file is refreshed with data from the index, and
   a contactless integrated circuit (IC) memory in communication with the processor device and embedded in the data storage cartridge, the contactless IC memory adapted for storing the table of contents (TOC).

8. The system of claim 7, wherein the processor device is further adapted for building the table of contents (TOC) specific to an owning application of a plurality of files to be recorded on the storage media by parsing the index of the plurality of files with the table of contents (TOC) profile file.

9. The system of claim 7, wherein the processor device is further adapted for storing the index on the storage media of the data storage cartridge.

10. The system of claim 7, wherein the processor device is further adapted for storing the TOC profile file on the storage media of the data storage cartridge.

11. The system of claim 7, wherein the processor device is further adapted for, previous to verifying consistency between the TOC written to the contactless IC memory and the index:
   building an additional TOC by reading the index and the TOC profile file from the storage media, and comparing the additional TOC with at least one of the TOC written to the contactless IC memory and the index to verify additional consistency.

12. The system of claim 7, wherein the processor device is further adapted for, pursuant to writing the TOC to the contactless IC memory, sending the TOC to a radio frequency (RF) communication unit for transmission to the contactless IC memory.

13. The system of claim 7, wherein the storage media is compatible with a Linear Tape Open-5 (LTO-5) data storage format.

14. The system of claim 7, wherein the automated data storage and retrieval system includes an automated tape library, and the data storage cartridge includes a tape cartridge device for insertion in to the automated tape library.

15. A computer program product for recording data on a contactless integrated circuit (IC) memory associated with a data storage cartridge, the computer program product comprising a non-transitory computer-readable storage medium having computer-readable program code portions stored therein, the computer-readable program code portions comprising:
 a first executable portion for verifying consistency between a TOC written to a contactless IC memory and an index, wherein if the TOC and the index are inconsistent, a TOC profile file is refreshed with data from the index; and
 a second executable portion for writing the TOC to the contactless IC memory.

16. The computer program product of claim 15, further including a third executable portion for parsing the index of a plurality of files to be recorded on the storage media of the data storage cartridge with the table of contents (TOC) profile file to build the table of contents (TOC) specific to an owning application of the plurality of files.

17. The computer program product of claim 15, further including a third executable portion for storing the index on the storage media of the data storage cartridge.

18. The computer program product of claim 15, further including a third executable portion for storing the TOC profile file on the storage media of the data storage cartridge.

19. The computer program product of claim 15, further including a fourth executable portion for, previous to verifying consistency between the TOC written to the contactless IC memory and the index:
 building an additional TOC by reading the index and the TOC profile file from the storage media, and
 comparing the additional TOC with at least one of the TOC written to the contactless IC memory and the index to verify additional consistency.

20. The computer program product of claim 15, further including a third executable portion for, pursuant to writing the TOC to the contactless IC memory, sending the TOC to a radio frequency (RF) communication unit for transmission to the contactless IC memory.

* * * * *